United States Patent
Mori

(10) Patent No.: US 7,474,787 B2
(45) Date of Patent: Jan. 6, 2009

(54) APPARATUS AND METHOD OF DETECTING SPECIFIED PATTERN

(75) Inventor: Toshihiro Mori, Osaka (JP)

(73) Assignee: Minolta Co., Ltd., Osaka (JP)

( * ) Notice: Subject to any disclaimer, the term of this patent is extended or adjusted under 35 U.S.C. 154(b) by 343 days.

(21) Appl. No.: 09/749,449

(22) Filed: Dec. 28, 2000

(65) Prior Publication Data

US 2001/0005431 A1    Jun. 28, 2001

(30) Foreign Application Priority Data

Dec. 28, 1999  (JP)  ............................ 11-373364
Dec. 28, 1999  (JP)  ............................ 11-373367

(51) Int. Cl.
*G06K 9/48* (2006.01)
*G06K 9/56* (2006.01)
*G06K 9/54* (2006.01)
*G06K 9/60* (2006.01)

(52) U.S. Cl. .................. 382/199; 382/205; 382/305

(58) Field of Classification Search ................ 382/199, 382/303, 205
See application file for complete search history.

(56) References Cited

U.S. PATENT DOCUMENTS

| | | | |
|---|---|---|---|
| 4,644,583 A | | 2/1987 | Watanabe et al. |
| 5,093,867 A * | | 3/1992 | Hori et al. .................... 382/141 |
| 5,390,003 A | | 2/1995 | Yamaguchi et al. ......... 355/201 |
| 5,459,795 A * | | 10/1995 | Kawamura et al. .......... 382/147 |
| 5,553,167 A * | | 9/1996 | Dowling ..................... 382/270 |
| 5,610,999 A * | | 3/1997 | Bannai et al. ............... 382/272 |
| 5,748,804 A * | | 5/1998 | Surka .......................... 382/291 |
| 5,902,987 A * | | 5/1999 | Coffman et al. ......... 235/462.12 |
| 5,905,807 A * | | 5/1999 | Kado et al. .................. 382/118 |
| 6,091,844 A | | 7/2000 | Fujii et al. |
| 6,192,153 B1 * | | 2/2001 | Suzuki et al. ................ 382/199 |
| 6,226,417 B1 | | 5/2001 | Yamagata et al. |
| 6,370,271 B2 * | | 4/2002 | Fu et al. ....................... 382/217 |
| 6,400,470 B1 * | | 6/2002 | Takaragi et al. ............. 358/448 |
| 6,480,302 B1 * | | 11/2002 | Kawano ..................... 358/2.1 |
| 6,526,161 B1 * | | 2/2003 | Yan ............................. 382/118 |

(Continued)

FOREIGN PATENT DOCUMENTS

JP    60-179881    9/1985

(Continued)

OTHER PUBLICATIONS

Japanese Office Actions mailed Feb. 14, 2006, directed to counterpart JP Application Nos. H11-373364 and H11-373367.

*Primary Examiner*—Matthew C. Bella
*Assistant Examiner*—Wesley Tucker
(74) *Attorney, Agent, or Firm*—Morrison & Foerster LLP

(57) ABSTRACT

In an apparatus which detects a specified pattern, a binarizing unit converts input image data to bi-level image data, and a storage device stores the converted bi-level image data. A pattern detection unit comprises a plurality of detectors which detect a specified pattern (for example, a circular pattern) independently of each other and in parallel to each other. Each of the detectors detects the specified pattern on a block different from those for the other detectors in the bi-level image data stored in the storage device. Then, one most probable block is selected among the blocks including the specified pattern, and careful image recognition is performed on the selected block.

9 Claims, 7 Drawing Sheets

U.S. PATENT DOCUMENTS

| | | |
|---|---|---|
| 6,529,630 B1 * | 3/2003 | Kinjo .................. 382/190 |
| 6,606,420 B1 * | 8/2003 | Loce et al. ............. 382/266 |
| 2002/0114521 A1 | 8/2002 | Fujii et al. |
| 2003/0194136 A1 | 10/2003 | Fujii et al. |

FOREIGN PATENT DOCUMENTS

| | | |
|---|---|---|
| JP | 6-245064 | 9/1994 |
| JP | 10-74240 | 3/1998 |
| JP | 11-053539 | 2/1999 |
| JP | 11-110562 | 4/1999 |

\* cited by examiner

APPARATUS AND METHOD OF DETECTING SPECIFIED PATTERN

This application is based on application Nos. 11-373364 and 11-373367 filed in Japan, the contents of which are hereby incorporated by reference.

BACKGROUND OF THE INVENTION

1. Field of the Invention

The present invention relates to image recognition for an image of a specified pattern.

2. Description of Prior Art

As a color copying machine provides more functions with improved performance, forgery becomes a big problem, and effective countermeasures for preventing forgery have been researched. In one of the countermeasures, specified patterns have been embedded in a pattern in a paper money or the like. When an image is read in copying operation in a copying machine, the scanned image is analyzed. When a specified pattern is detected in image recognition, it is decided that a paper money or the like is going to be copied, and a normal image forming is forbidden.

Many data received from an input apparatus are color images having a large amount of information. Further, input or output apparatuses are operated at higher speed and at higher resolution. On the other hand, the image recognition of specified patterns is required to be processed in real time, while a hardware structure therefor has a more complicated structure. Therefore, in order to prevent forgery, it is an important problem to develop image recognition of specified patterns which can be performed at high speed, at high precision and with a simple structure.

SUMMARY OF THE INVENTION

An object of the present invention is to provide an apparatus and a method which recognize an image of a specified pattern at higher speed.

In one aspect of the present invention, an apparatus which detects a specified pattern comprises a binarizing unit which converts input image data to bi-level image data, a storage device which stores the bi-level image data converted by the binarizing unit, and a pattern detection unit comprising a plurality of detectors which detect a specified pattern (for example, a circular pattern) independently of each other and in parallel to each other. Each of the detectors detects the specified pattern on a block different from those for the other detectors in the bi-level image data stored in the storage device. Then, one most probable block is selected among the blocks including the specified pattern, and the selected block is checked with careful image recognition.

In another aspect of the invention, a method for detecting a specified pattern comprises the steps of converting input image data to bi-level image data, storing the converted bi-level image data, and detecting the specified pattern at the same time on a plurality of blocks in the stored bi-level image data.

In a further aspect of the invention, an apparatus which detects a specified pattern comprises a binarizing unit which converts input image data to bi-level image data, a storage device which stores the bi-level image data converted by the binarizing unit, and a pattern detection unit which detects the specified pattern at the same time on a plurality of blocks in the stored bi-level image data.

An advantage of the present invention is that pattern detection of a specified pattern can be performed precisely at high speed.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
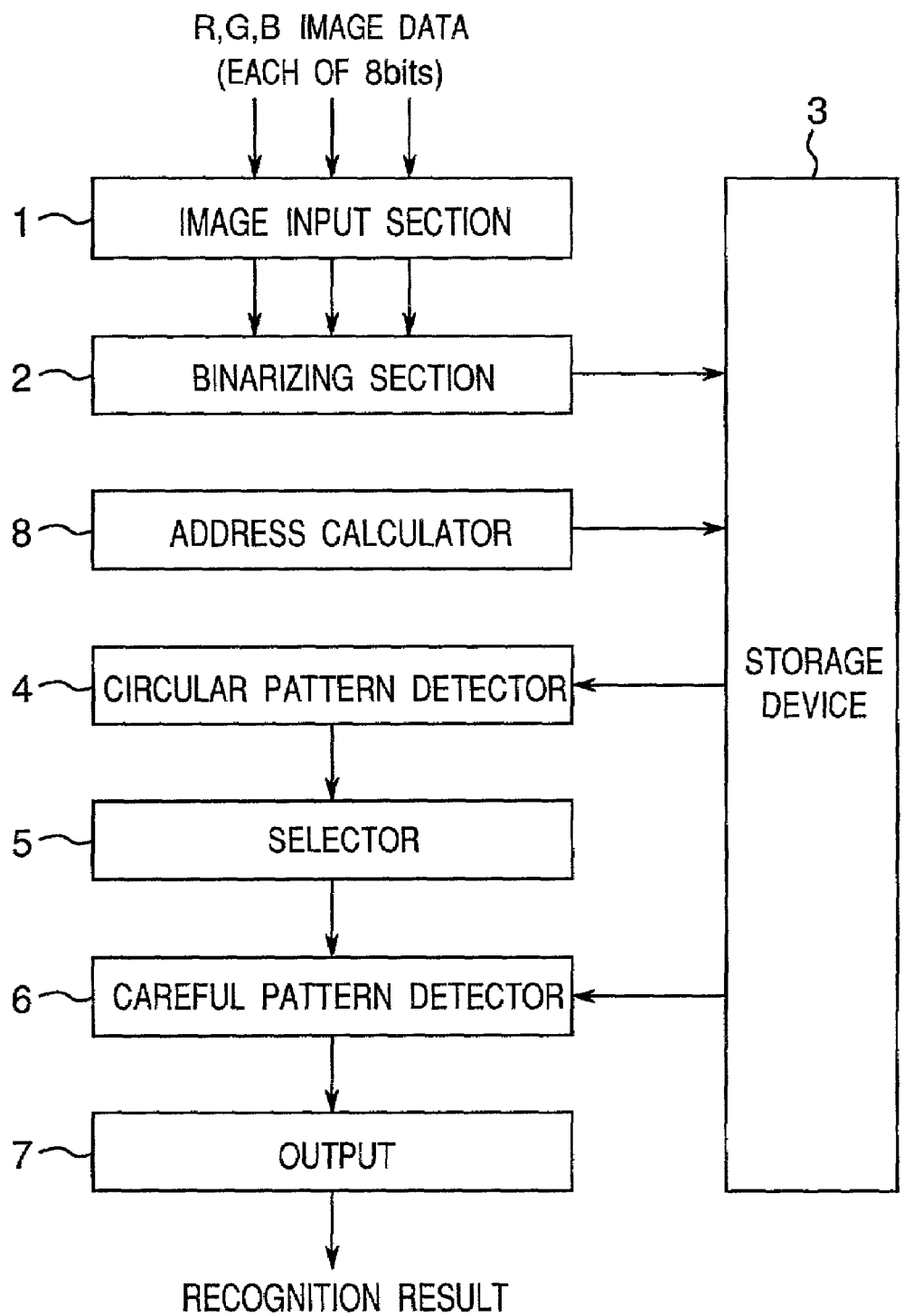
FIG. 1 is a schematic block diagram of a detecting apparatus for specified patterns.

Referring now to the drawings, wherein like reference characters designate like or corresponding parts throughout the several views, FIG. 1 shows a detecting apparatus for specified patterns (marks) of an embodiment of the invention. In the detecting apparatus, an image input section 1 receives image data according to density of R (red), G (green) or B (blue) as 8-bit data (256-gradation-level data). Further, the input image data are subjected to preprocessing such as resolution conversion and magnification change. Next, a binarizing section 2 performs binarization by deciding whether the input image data is within a reference range determined beforehand. In other words, image data of each color is compared with a threshold value for each pixel, to convert it to a bi-level image data. The bi-level image data is stored in a storage device 3. (Hereinafter, a pixel within the reference range is referred to as "black pixel", while a pixel outside the reference range is referred to as "white pixel".) The storage device 3 stores the image data binarized by the binarizing section 2, and it has a storage capacity which can store data of lines wider than a size of a pattern to be detected.

A circular pattern detector 4 has a plurality of circular pattern detection blocks shifted by m pixels in the main direction and by n pixels in the subscan direction, respectively, and it detects the circular pattern by the blocks at the same time. Practically, image data of three detection blocks adjacent to each other in the main scan direction are taken out from the bi-level data stored in the storage device 3, and the circular pattern detector 4 performs the decision on these blocks at the same time. Further, the same blocks are used repetitively three times in the subscan direction. Thus, the circular pattern is detected on nine blocks.

Next, a selector 5 selects one most probable block according to predetermined conditions based on the detection results. That is, one most probable candidate block is detected among blocks, wherein the circular pattern is detected, in the nine blocks. A careful pattern detector 6 performs careful pattern recognition of the circular pattern only for the selected most probable block, and similarity with the reference image is decided. In this processing, patterns in the circular pattern are checked carefully by using pattern matching with the reference image or the like, and similarity of the pattern to the reference pattern to be detected is outputted. The processing can be performed at high speed because only the most probable block is subjected to the precise pattern recognition. Finally, an output section 7 outputs scores on the degree of true circle and on the result of pattern recognition by the careful pattern detector 6. Then, it is decided based on the scores whether it is the prescribed pattern or not. An address calculator 8 is provided to calculate an address for the storage device 3 which stores the data.

The circular pattern detector 4 and the selector 5, which are characteristics of the pattern detection apparatus of this embodiment, are explained below in detail.

Figure 2A:
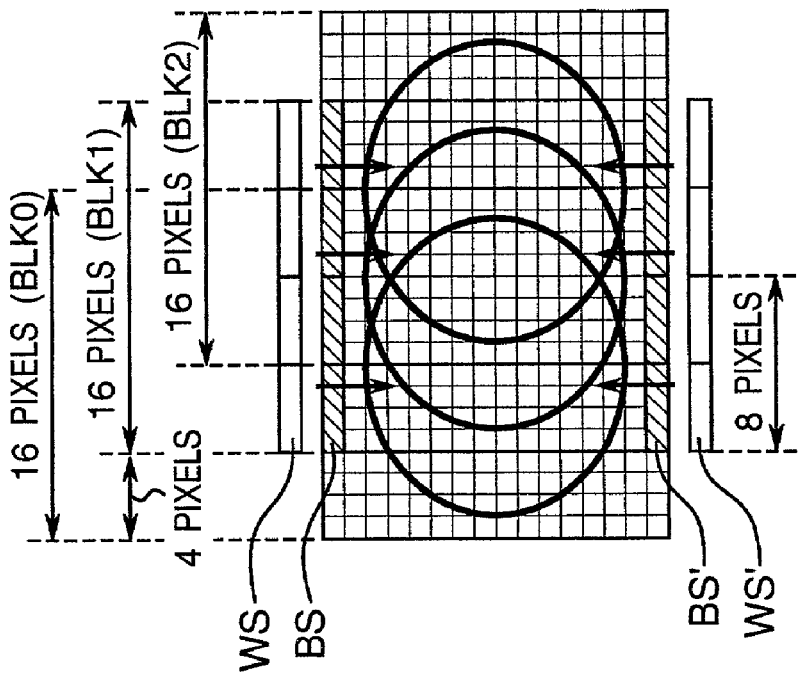
FIGS. 2A and 2B are diagrams for illustrating processing by using three circular pattern detectors.
Figure 2B:
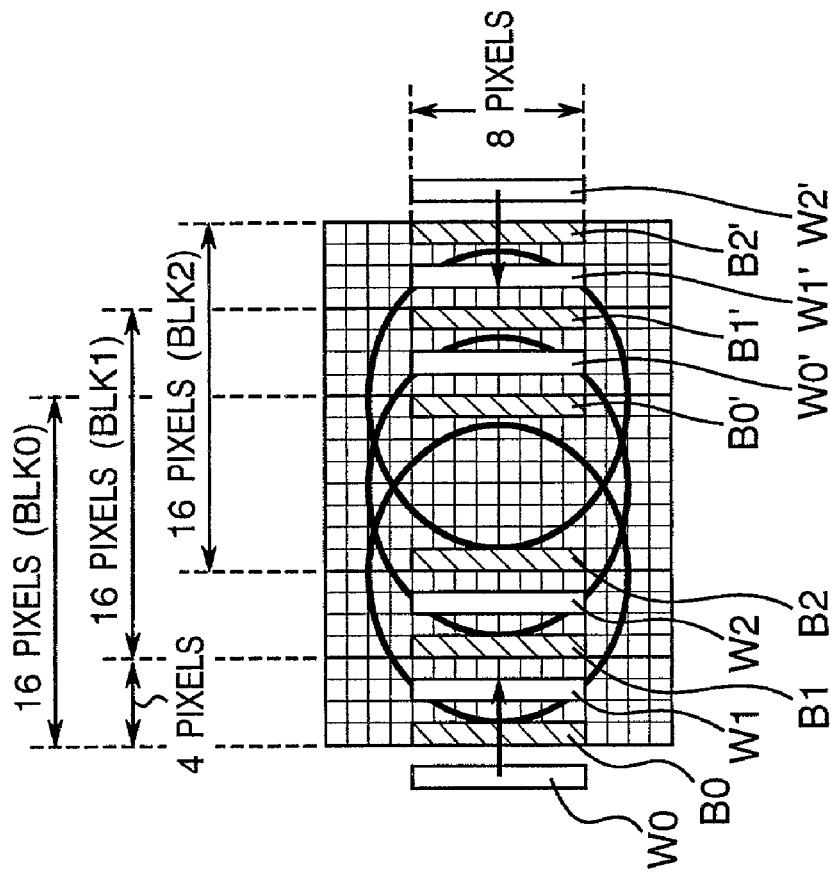

FIGS. 2A and 2B illustrate detection of circular pattern by a circular pattern detector 4. Detection size of a detection block is 16*16 pixels, and three blocks, BLK0, BLK1, BLK2, are arranged by shifting by four pixels in the main scan direction. The circular pattern is detected in parallel at the same time on the three blocks in an area of 16*24 pixels including the three blocks. The processing can be performed at high speed because the blocks are processed at the same time. Because the processing can be performed in the unit of 16 bits, the pattern detection can be performed efficiently on the area of 16*24 pixels by using overlapping portions of the blocks commonly, as will be explained later. The three circular patterns in FIGS. 2A and 2B are illustrated for the explanation of the blocks, and they are not arranged actually in this way.

When the circular pattern is detected, a plurality of the above-mentioned detection blocks are arranged in the main scan direction, and the circular pattern is detected at the same time. For each detection block, a scan block of predetermined pixel width is provided to detect a circular pattern by moving the scanning block in the vertical direction (subscan direction) and in the horizontal direction (main scan direction). In detail, black edge detection blocks for detecting black edge are provided at four positions at top, bottom, left and right in the 16*24 pixel area, and white edge detection blocks for detecting white edge are provided outside the black edge detection blocks. The black and white detection blocks have a width of eight pixels narrower than the diameter of the circular pattern. As shown in FIG. 2A, in the horizontal direction, three sets of black edge detection blocks B0, B1, B2, B0', B1', B2' are located at left and right sides separated by four pixels. By moving the positions thereof in a direction of an arrow shown in FIG. 2A, detection is performed on the three blocks. Further, as shown in FIG. 2B in the vertical direction, black edge detection blocks B5, B5' of width of 16 pixels are located at top and bottom sides. The detection blocks of left eight pixels, central eight ones and right eight pixels correspond to the blocks BLK0, BLK1 and BLK2. A number of black pixels in each detection block is counted by moving the detection block of top, bottom, left and right one pixel by one pixel towards the center of the corresponding detection block, BLK0, BLK1, BLK2. When the count is equal to or larger than five, it is determined that a line at the outer periphery of the circle is detected, and a flag which represents "detection" is set for the black edge detection. The black edge detection block sums black pixels to depth of five pixels towards the center of the detection block, and if the count is smaller than five, the detection flag is not set, and the processing is completed. The white edge detection block is arranged by two pixels outside the black edge detection block, and it is moved towards the center of the detection block. The white edge detection block always confirms whether all the data of 8* 2 pixels are white pixels or not, and the processing is stopped when the detection flag of the black edge detection block is set. The detection flag is set if the detection data shows that all the pixels on the white detection block are white.

When the processing is completed to the depth of five pixels towards the center of the detection block, it is checked whether the detection flags of eight positions at top, bottom, left and right. If all the flags are set, it is decided that a circle is detected, and a total detection flag for the detection block is set. The detection of the circular pattern is performed three times in the subscan direction, so that detection is performed on a total of nine blocks of 3*3 blocks. The total detection flag is provided for the nine blocks, and the detection results are held until the detection is completed three times. Further, a latch for holding the detection positions of the four black edge detectors holds the detection results until the processing is completed.

Figure 3:
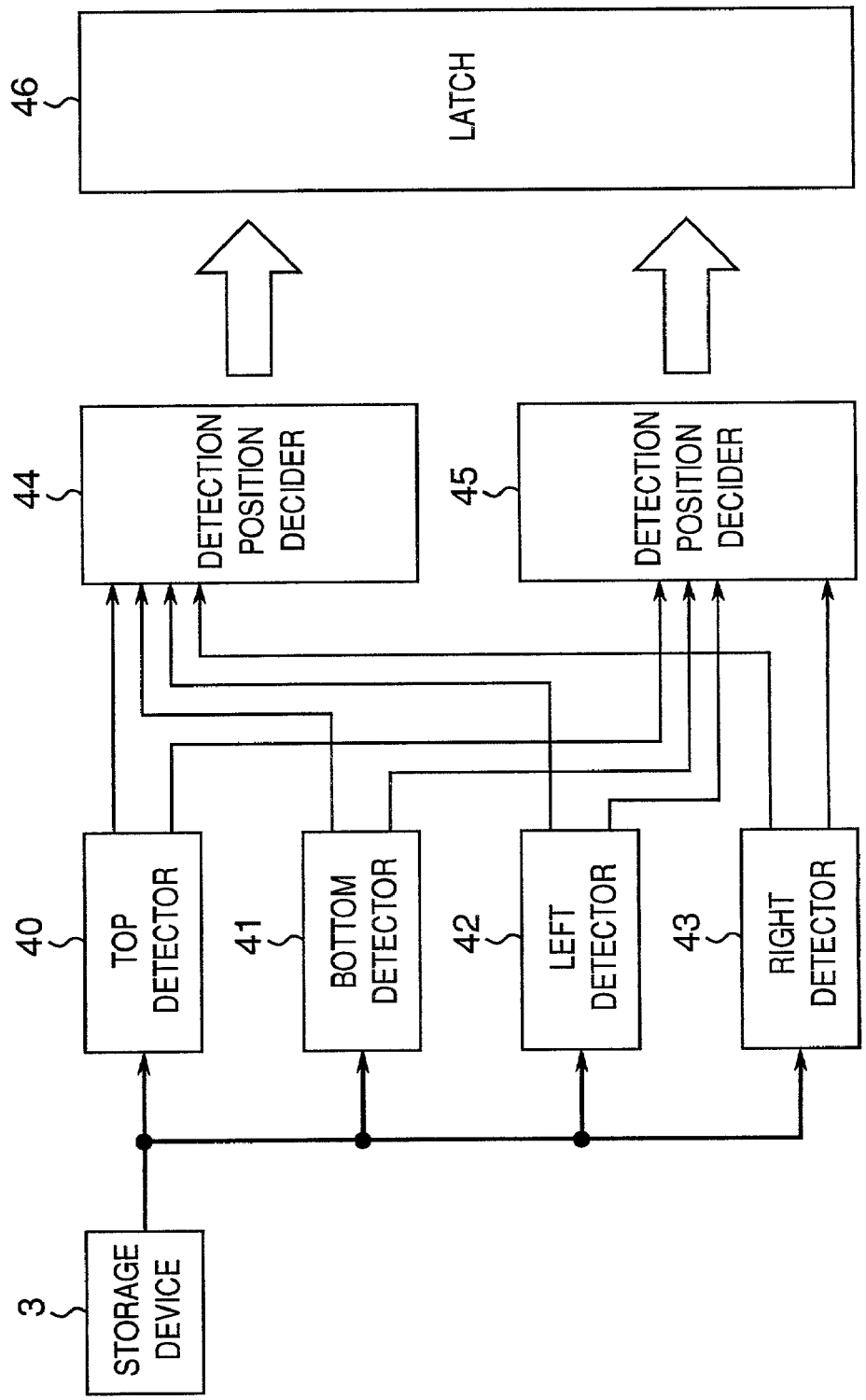
FIG. 3 is a circuit diagram of the circular pattern detector.

FIG. 3 shows a hardware circuit of the circular pattern detector generally. A storage device 3 stores bi-level image data as a result of binarization by a binarizing device 2. Four detectors 40, 41, 42 and 43 of top, bottom, left and right output detection result and detection position of circular pattern. Each detector 40, 41, 42 and 43 has a detector for black and another detector for white. A detection position decider 44 decides detection position of blocks. Another detection result decider 45 decides general detection result of each block. A latch 46 holds the detection position of each block and the general detection result.

Figure 4:
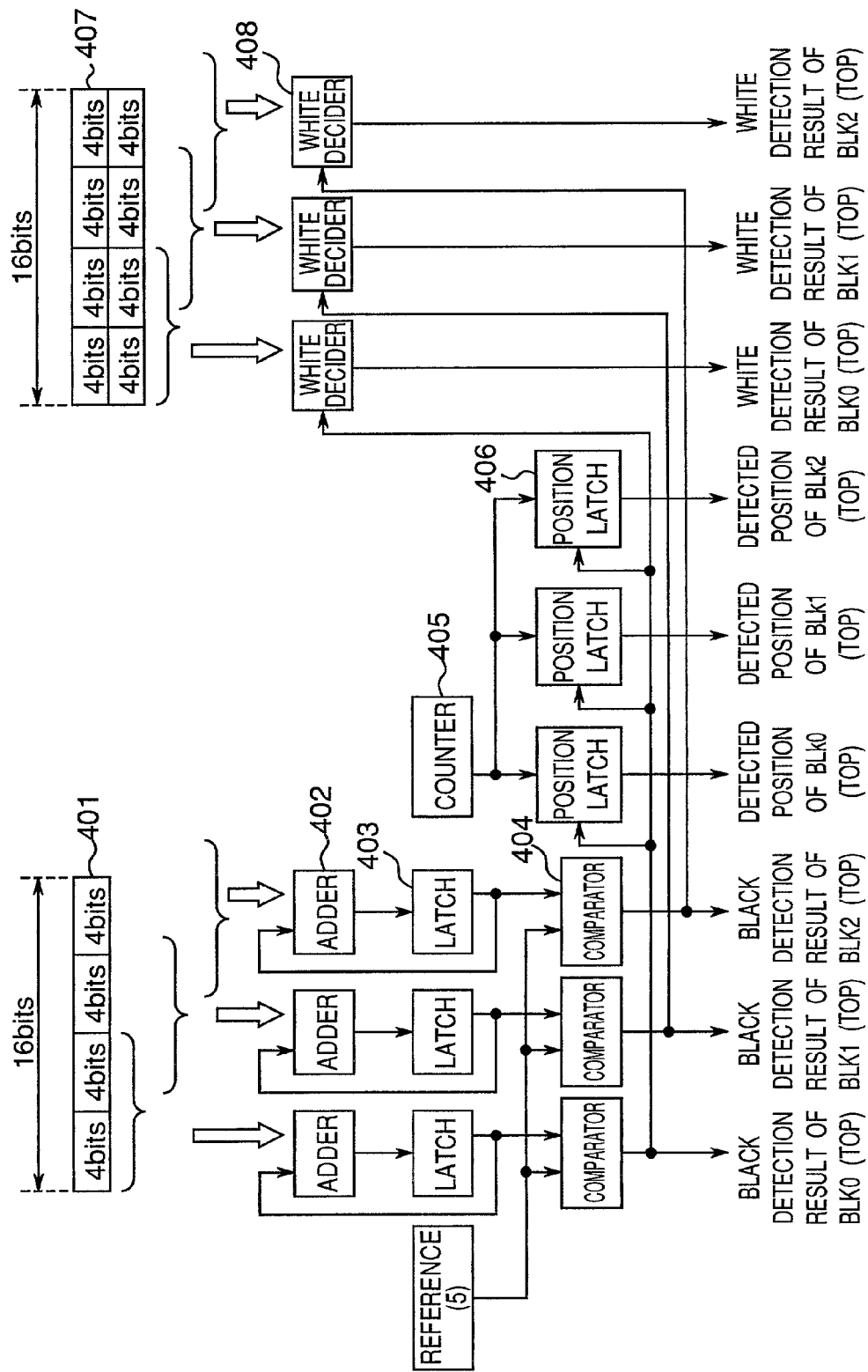
FIG. 4 is a block diagram of a top detector.

FIG. 4 shows a top detector 40 in detail. A data latch 401 for 16-bit data reads and holds the detection data obtained by the black edge detection block and stored in the storage device 3, in the unit of 8 or 16 bits. Among 16-bit data, bits 7-0 in correspondence to block BLK0, bits 11-4 in correspondence to block BLK1 and bits 15-7 in correspondence to block BLK2 are processed at the same time in parallel. For each block, an adder 402 sums the data in the data latch 401 and that in the data latch 403, and the data latch 403 holds the sum obtained by the adder 402. The latch 403 is cleared to zero at the start of the processing. A comparator 404 compares the data held by the latch 403 with a reference (five in this example), and when the data held is larger than the reference, it outputs the black detection result (as "on" signal). The output is sent to the detection result latch 45.

When the processing in the detector is started, a counter 405 starts counting and counts up in synchronization of the processing. The counter 405 is cleared to zero at the start of the processing. Three position latches 406 are provided for the three blocks, and each of the position latches 406 holds a count value when the output of the comparator becomes one. The count is kept until the processing of the total nine blocks is completed.

Further, a data latch 407 of 16 bits of two lines is provided for detection of a white edge for three processing blocks by three white deciders 408 on pixel data by the white edge detection blocks stored in the storage device 3. As to input data of two lines outside the black edge detection line when outputs of the three comparators 404 become "on", each white decider 408 decides whether each of 8 bits or a total of 16 bits of input data of bits 7-0 in correspondence to block BLK0, bits 11-4 in correspondence to block BLK1 or bits 15-7 in correspondence to block BLK2, are all white or not, and the decision result is outputted to a detection result decider 45.

The bottom detector 42 has a similar circuit structure. It is also possible to provide one circuit which is used twice as the top detector 40 and as the bottom detector 41.

Figure 5:
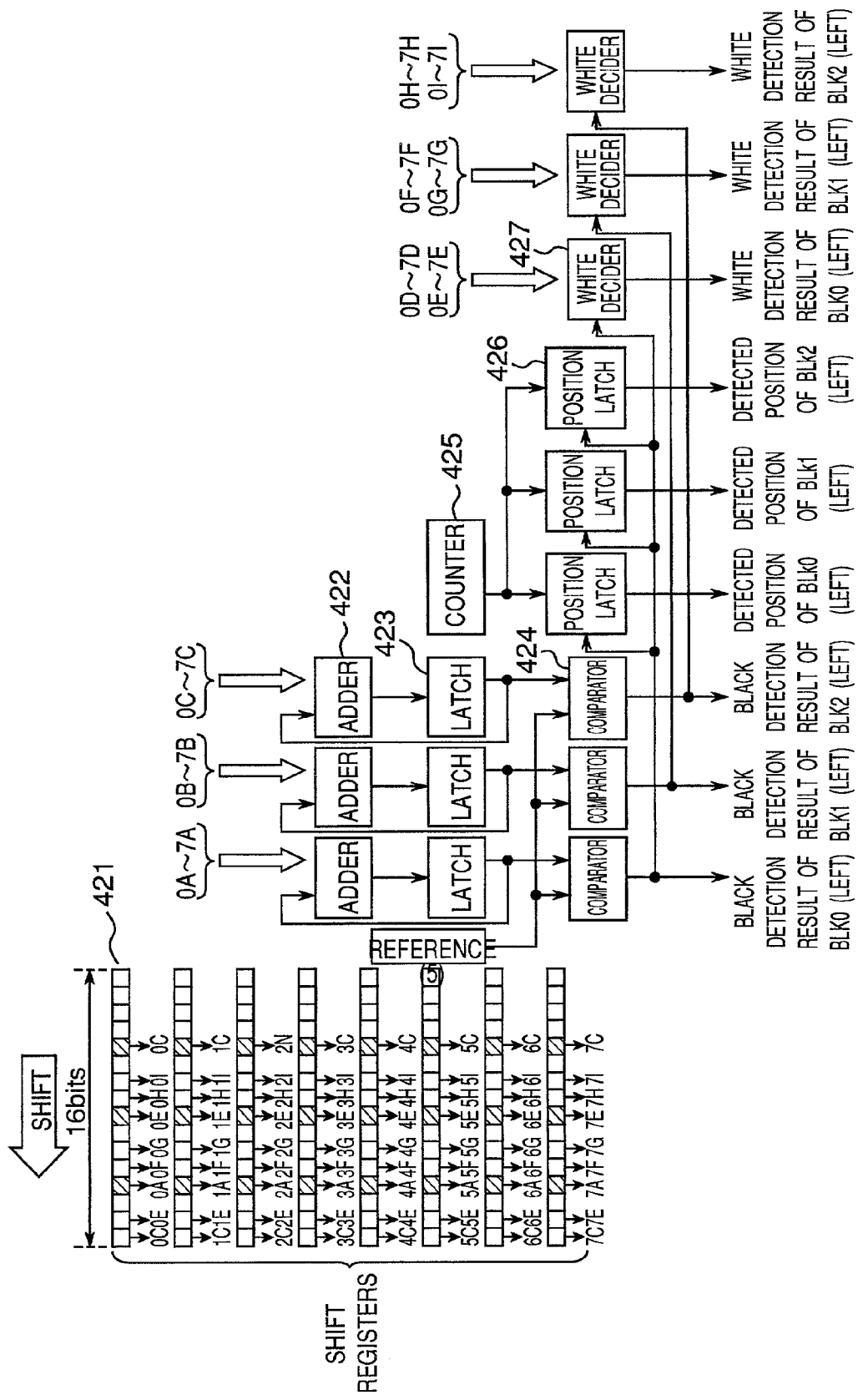
FIG. 5 is a block diagram of a left detector.

FIG. 5 shows a left detector 42 in detail. Eight 16-bit shift registers 421 shift 8-bit input data of the black edge detection block in the left direction in synchronization of clock CLK. Each 8-bit data at the fourth bit (0A-7A), at the eighth bit (0B-7B) and at the twelfth bit (0C-7C) in the shift register shown in FIG. 5 are sent to an adder 422. Further, each 16-bit data of 0D-7D and 0E-7E, 0F-7F and 0G-7G, 0H- 7H and 0I-7I of the two lines of two pixels and three pixels outside the black detection line are sent to a white decider 427. The circuit structure from the adder 422 to the white decider (that is, a latch 423, a comparator 424, a counter 425 and a position latch 426) are similar to the counterpart in the top detector 41, and detail explanation thereof is omitted here.

The left detector 43 also has a similar circuit structure. However, the shift direction of the shift register is reverse, and the output positions of data output from the shift register are reverse in the horizontal direction.

Further, similarly to the top and bottom detectors 40 and 41, it is also possible to provide one circuit and to use it twice as the left detector 42 and as the right detector 43. In this case, an additional circuit such as a data inverter (LSB, MSB) is necessary before entering data to the shift register.

Figure 6:
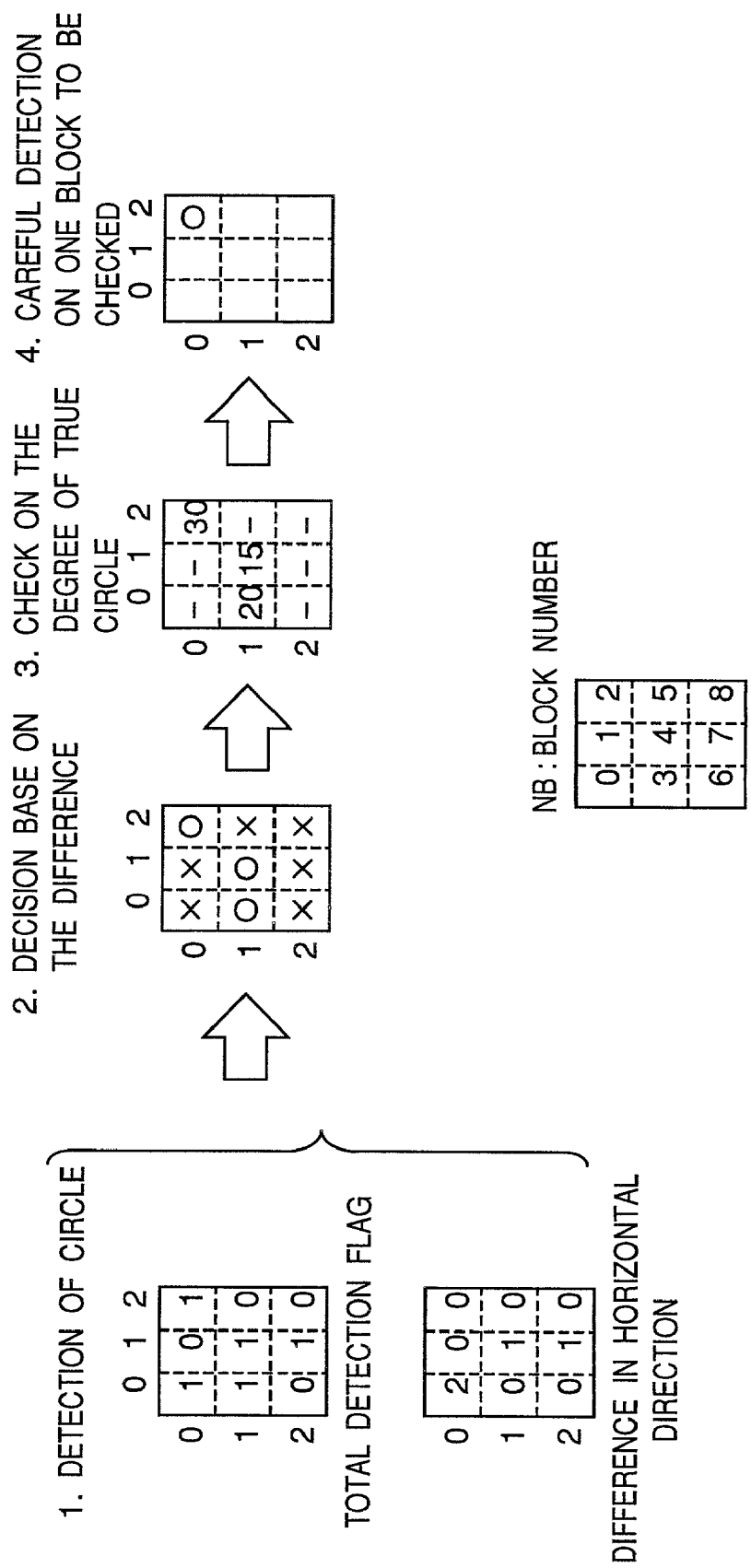
FIG. 6 is a block diagram of selection of one block from nine blocks as an object to be recognized carefully.

FIG. 6 illustrates a concept of selection of one block from nine blocks as an object to be recognized precisely by the selector 5. Block numbers of "0" to "8" are shown at the bottom in FIG. 6. In the detection of a circle, the total detection flags and differences in the horizontal direction are obtained. The total detection flag represents detection results of circle on each block. The difference in the horizontal direction of circular pattern is obtained according to the stored detection positions. As the difference is smaller, the circle pattern is nearer the true circle.

First, one block is selected among the nine blocks according to the total detection flags and the differences in the horizontal direction. In this processing, one is selected among the blocks 0, 3 and 6, one is selected among the blocks 1, 4 and 7 and one is selected among the blocks 2, 5 and 8 shown in FIG. 6. In the selection, a block is selected when the total detection flag is set and the difference is the smallest. If the differences are the same among a plurality of blocks, any one of them may be selected. In this embodiment, the block of the smallest block number is selected.

Next, the degree of true circle is checked on the selected three blocks. In the processing, sample points in the circumference and those outside the circumference are checked in detail, and a block of higher degree of true circle is selected. By checking each of the three blocks on the degree of true circle, a score is calculated. A block of the highest score is selected as an object to be checked carefully.

Figure 7:
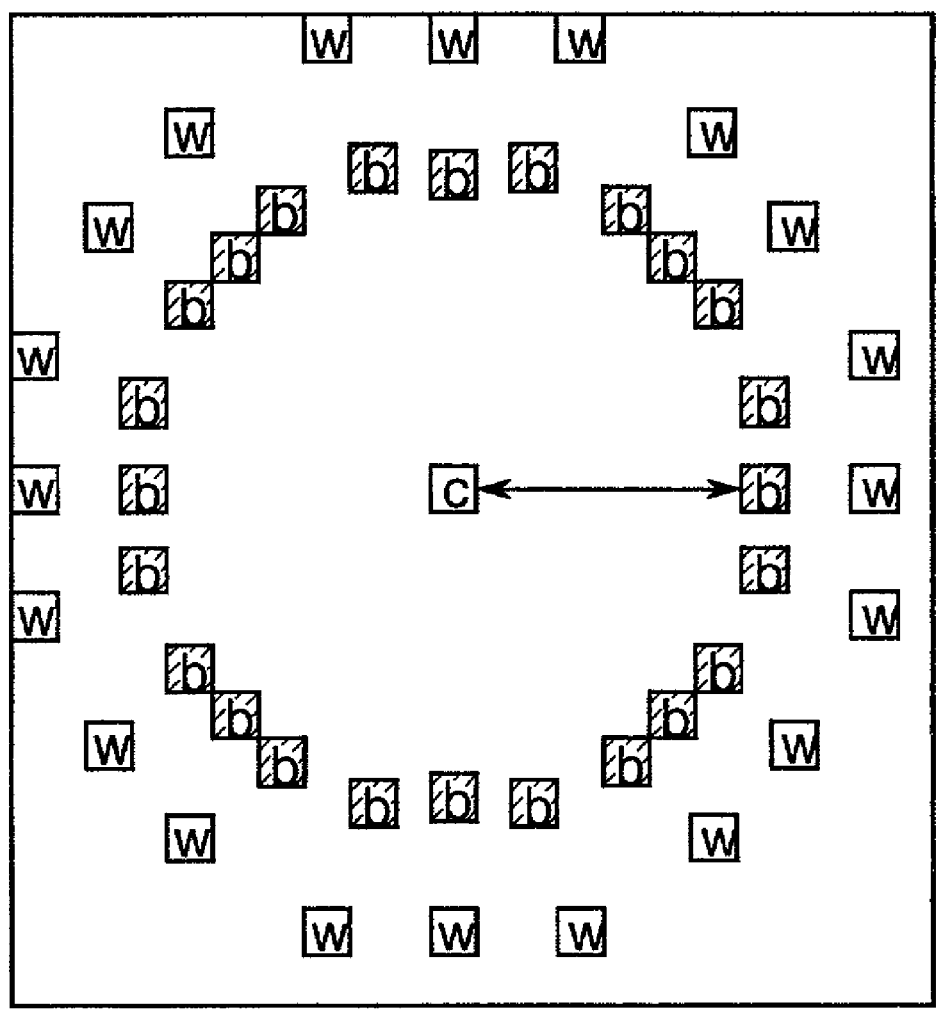
FIG. 7 is a diagram for illustrating processing of degree of true circle.

FIG. 7 illustrates concept on the processing of degree of true circle schematically. The center R and the radius R are determined according to the top, bottom, left and right positions detected by the circular pattern detector 4. Based on the center R and the radius R, coordinates of sampling points on the circumference (point "b" in FIG. 7) and those of sampling points (point "w" in FIG. 7) outside the circumference are determined. (In this example, the number of point "b" is 24, and that of point "w" is 20.) The data of the pixels of sample points are read from the storage device 3, and the number of points "b" of black pixel and that of point "w" of white pixel are counted. A block having the larger count is decided as the most probable block.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus which detects a circular pattern in a document image to recognize a specified image, comprising:
    a binarizing unit which converts input image data to bi-level image data;
    a storage device which stores the bi-level image data converted by said binarizing unit;
    a plurality of edge detectors which detect an edge of a circle on each of a plurality of detection blocks in the bi-level image data stored in said storage device, wherein detection on the detection blocks is performed independently and simultaneously;
    a detection result decider of a circular pattern which decides a general detection result for each of the detection blocks based on results detected by the plurality of edge detectors; and
    a selector which selects a detection block of highest possibility of the existence of the circular pattern among a plurality of detection blocks wherein the circular pattern is detected by said detection result decider, wherein
        said selector selects the detection block of highest possibility based on the degree of a true circle, and
        the degree of a true circle is calculated by determining a center and a radius of a circular pattern based on the edge positions stored in said storage device, and by determining coordinates of a plurality of sample points on a circumference based on the determined center and radius wherein the sample points are edges stored in said storage device.

2. The apparatus according to claim 1, wherein said edge detector overlaps the detection block and sums a number of specified pixels included in the edge detection block while moving in the detection block in a specified direction.

3. The apparatus according to claim 1, further comprising a latch which holds the detection position of each detection block and said general detection result.

4. The apparatus according to claim 1, further comprising a careful circle pattern detector which performs careful pattern recognition of the circular pattern only for the selected most probable detection block and decides a similarity with the reference image.

5. The apparatus according to claim 1, wherein said edge detector comprises a black pixel edge detector which detects an edge of black pixel in the circular pattern in the block and a white pixel edge detector which detects an edge of white pixel outside the edge of the black pixel.

6. A method for detecting a circular pattern in a document image to recognize a specified image, comprising:
    converting input image data to bi-level image data;
    storing the converted bi-level image data;
    detecting, with a plurality of edge detectors, an edge of a circle on each of a plurality of detection blocks in the bi-level image data stored in said storage device, wherein detection on the detection blocks is performed independently and simultaneously;
    deciding a general detection result for each of the detection blocks based on results detected by the plurality of edge detectors; and
    selecting a detection block of highest possibility of the existence of the circular pattern among a plurality of detection blocks wherein the circular pattern is detected, wherein
        selecting the detection block of highest possibility is based on the degree of a true Circle, and
        the degree of a true circle is calculated by determining a center and a radius of a circular pattern based on the edge positions stored in said storage device, and by determining coordinates of a plurality of sample points on a circumference based on the determined center and radius wherein the sample points are edges stored in said storage device.

7. The method according to claim 6, wherein said edge detector overlaps the detection block and sums a number of specified pixels included in the edge detection block while moving in the detection block in a specified direction.

8. The method according to claim 6, further comprising holding the detection position of each detection block and said general detection result in a latch.

9. The method according to claim 6, further comprising performing careful pattern recognition of the circular pattern only for the selected most probable detection block and determining a similarity with the reference image.

* * * * *